(12) United States Patent
Reed

(10) Patent No.: US 10,863,675 B2
(45) Date of Patent: Dec. 15, 2020

(54) SHEETING SYSTEM

(71) Applicant: Patrick John Reed, Bury St Edmunds (GB)

(72) Inventor: Patrick John Reed, Bury St Edmunds (GB)

(*) Notice: Subject to any disclaimer, the term of this patent is extended or adjusted under 35 U.S.C. 154(b) by 0 days.

(21) Appl. No.: 16/308,151

(22) PCT Filed: Jun. 1, 2017

(86) PCT No.: PCT/GB2017/051566
§ 371 (c)(1),
(2) Date: Dec. 7, 2018

(87) PCT Pub. No.: WO2017/212221
PCT Pub. Date: Dec. 14, 2017

(65) Prior Publication Data
US 2019/0141902 A1 May 16, 2019

(30) Foreign Application Priority Data
Jun. 8, 2016 (GB) .................................. 1609985.5

(51) Int. Cl.
*A01F 25/00* (2006.01)
*B65D 71/00* (2006.01)
*A01F 25/13* (2006.01)

(52) U.S. Cl.
CPC .................................. *A01F 25/13* (2013.01)

(58) Field of Classification Search
CPC .......... A01F 13/00; A01F 15/00; A01F 25/04; A01F 25/10; A01F 25/13; A01F 1/06;
(Continued)

(56) References Cited

U.S. PATENT DOCUMENTS 644,242 A * 2/1900 Combs .................... A01F 25/16
52/3
1,103,793 A * 7/1914 Martin .................... A01F 25/10
52/5
(Continued)

FOREIGN PATENT DOCUMENTS

AU 475969 1/1975
AU 2008207490 A1 3/2009
(Continued)

OTHER PUBLICATIONS

English language abstract of European Patent Application Publication No. EP 0898873 A1, European Patent Office, Mar. 3, 1999.
(Continued)

*Primary Examiner* — Brian E Glessner
*Assistant Examiner* — James J Buckle, Jr.
(74) *Attorney, Agent, or Firm* — Dascenzo Gates Intellectual Property Law, P.C.

(57) ABSTRACT

Methods of positioning a protective sheet over a stack of goods comprise: engaging a lifting device to lift a first elongate member adjacent to a first side of the stack; projecting a positioning strap from a positioning strap projector, such that the positioning strap passes over a top of the stack and down a second side of the stack; securing the positioning strap and disengaging the first elongate member so that the sheet is free of the lifting device; applying tension to the positioning strap to pull the first elongate member across the top of the stack towards the second side of the stack whilst also lifting a second elongate member up the first side of the stack; and once the sheet is in place over the stack, securing the securing strap to a respective location at or near a base of the first and second sides of the stack.

6 Claims, 5 Drawing Sheets

(58) Field of Classification Search
CPC .. B60J 7/10; B60J 7/102; E04H 15/54; E04H 4/10; Y10S 52/12
USPC ............ 52/4, 5, 122.1, 123.1, 125.2, 125.6, 52/DIG. 12, DIG. 14, 745.06, 745.2
See application file for complete search history.

(56) References Cited

U.S. PATENT DOCUMENTS

| | | | | |
|---|---|---|---|---|
| 1,368,134 | A * | 2/1921 | Gilchrist | A01F 25/10 56/473.5 |
| 1,439,226 | A * | 12/1922 | Clarke | A01F 25/10 52/66 |
| 2,635,562 | A * | 4/1953 | Abramson | A01F 25/10 52/3 |
| 2,965,408 | A * | 12/1960 | Edwards | B66C 1/64 294/81.5 |
| 2,977,900 | A * | 4/1961 | Farrar | B61D 39/00 105/377.01 |
| 3,184,764 | A | 5/1965 | West | |
| 3,204,798 | A * | 9/1965 | Becker | B65D 19/44 414/607 |
| 3,921,837 | A * | 11/1975 | Vandewater | A01D 87/127 414/24.5 |
| 4,033,367 | A * | 7/1977 | Johnston | A01G 9/18 135/100 |
| 4,043,085 | A * | 8/1977 | Ochiai | B60P 7/04 52/3 |
| 4,049,140 | A * | 9/1977 | Roose | A01D 87/127 414/24.6 |
| 4,221,085 | A * | 9/1980 | Conaghan | A01F 25/13 150/154 |
| 4,248,343 | A * | 2/1981 | Schaefer | A01F 25/13 150/154 |
| 4,280,777 | A * | 7/1981 | Gray | B62D 49/02 414/24.6 |
| 4,671,724 | A * | 6/1987 | Bolton | B65G 59/063 221/283 |
| 4,712,672 | A * | 12/1987 | Roy | A01F 25/13 206/83.5 |
| 4,869,363 | A * | 9/1989 | Goldberg | A01F 25/13 206/83.5 |
| 4,927,317 | A * | 5/1990 | Acosta | B09B 1/004 212/259 |
| 5,184,934 | A * | 2/1993 | Gallo | B66F 9/065 125/12 |
| 5,197,236 | A | 3/1993 | Calhoun et al. | |
| 5,304,014 | A * | 4/1994 | Slutz | B09B 1/004 111/200 |
| 5,524,505 | A * | 6/1996 | Lawrence | B25G 1/043 16/427 |
| 5,572,833 | A * | 11/1996 | Allen | A01F 25/13 52/3 |
| 5,579,794 | A * | 12/1996 | Sporta | E02D 5/801 135/88.01 |
| 5,709,064 | A * | 1/1998 | Swartz | A01F 25/13 206/83.5 |
| 5,769,368 | A * | 6/1998 | Busey | A47F 7/17 248/125.7 |
| 5,964,236 | A * | 10/1999 | Berke | B60P 7/04 135/115 |
| 5,966,877 | A * | 10/1999 | Hawes | E04G 21/28 52/3 |
| 6,003,929 | A * | 12/1999 | Birdsell | B60P 7/0876 150/166 |
| 6,273,113 | B1 * | 8/2001 | Streyckmans | B60J 11/00 135/88.13 |
| 6,299,094 | B1 * | 10/2001 | James, Jr. | A01G 13/0287 242/390 |
| 6,474,022 | B1 * | 11/2002 | Double | B60J 7/10 135/115 |
| 6,575,393 | B1 * | 6/2003 | James, Jr. | A01G 13/0287 242/390 |
| 7,182,387 | B2 * | 2/2007 | Hartman | B60J 7/102 296/100.12 |
| 7,389,957 | B1 * | 6/2008 | Struksnes | E01C 23/03 242/403 |
| 8,205,393 | B1 * | 6/2012 | Harrop | B09B 1/004 405/129.9 |
| 8,376,673 | B2 * | 2/2013 | Komarnisky | B60P 7/0823 410/35 |
| 8,464,974 | B2 * | 6/2013 | Schillo | B60P 7/0876 242/403 |
| 9,126,521 | B1 | 9/2015 | McCullough | |
| 10,029,812 | B1 * | 7/2018 | Crosby | B65B 11/02 |
| 10,427,916 | B1 * | 10/2019 | Fisher | E02D 7/00 |
| 10,499,571 | B2 * | 12/2019 | Kitchen | A01G 13/0287 |
| 2001/0048853 | A1 * | 12/2001 | Kozak | B09B 1/004 405/129.9 |
| 2003/0026681 | A1 * | 2/2003 | Christensen | B60J 7/102 414/607 |
| 2003/0140568 | A1 * | 7/2003 | Glynos | A01F 25/13 52/4 |
| 2004/0131454 | A1 * | 7/2004 | Voghel | E02D 31/004 414/437 |
| 2004/0261325 | A1 * | 12/2004 | Glynos | A01F 25/13 52/4 |
| 2005/0079275 | A1 * | 4/2005 | Nes | A01F 15/071 427/4 |
| 2005/0155684 | A1 * | 7/2005 | Lummis | B65D 85/07 150/154 |
| 2006/0150537 | A1 * | 7/2006 | Baum | A01F 25/13 52/90.1 |
| 2006/0153657 | A1 | 7/2006 | Goulet | |
| 2006/0283531 | A1 * | 12/2006 | Eisenbarth | A01F 25/13 150/154 |
| 2007/0256796 | A1 * | 11/2007 | Wedin | A01F 25/13 160/121.1 |
| 2010/0287847 | A1 * | 11/2010 | Smith | E04B 1/3445 52/79.5 |
| 2012/0187232 | A1 * | 7/2012 | Molen | B60P 7/0876 242/557 |
| 2014/0117296 | A1 * | 5/2014 | Shrader | B60P 7/0876 254/278 |
| 2015/0117975 | A1 | 4/2015 | Wright | |
| 2016/0069099 | A1 * | 3/2016 | Ohlen | E04H 12/12 52/123.1 |

FOREIGN PATENT DOCUMENTS

| | | |
|---|---|---|
| EP | 0898873 A1 | 3/1999 |
| GB | 2349158 A | 10/2000 |
| WO | WO 2006/076500 A2 | 7/2006 |

OTHER PUBLICATIONS

Search Report issued in connection with United Kingdom Patent Application No. GB 1609985.5, 2 pages, United Kingdom Intellectual Property Office, dated Oct. 19, 2017.

* cited by examiner

US 10,863,675 B2

SHEETING SYSTEM

TECHNICAL FIELD

The present invention relates to a method of positioning a protective sheet to cover a stack of goods, the stack of goods comprising the protective sheet in place, the protective sheet, and the support for delivering the sheet into position.

BACKGROUND AND PRIOR ART

It is estimated that the demand for straw for use in biofuel power stations will be approximately 1 million tonnes per year by 2018. This has resulted in a market developing for providing large quantities of straw.

Straw is typically grown and then harvested and formed into bales. A number of such bales are typically stacked together to form large stacks for example with a height of 10 metres. Such stacks then remain in place until it is desirable or timely to transport the material to a power station for consumption.

As such, these stacks of straw may spend a considerable time outside exposed to the elements. In particular rain water can cause wastage and rot of the top layer of straw bales. Such wasted bales are typically disposed of at zero value to the grower.

It would be desirable therefore to cover the stack of straw with a protective sheet or similar. However, in view of the height of such stacks, it is not safe or even legal, due to health and safety legislation, to send a human being up to place a protective sheet onto such a stack.

Additionally, such stacks are often so large that they have a risk of bales coming loose or even being toppled by high winds, resulting in further loss of valuable product.

Therefore there exists a need for reducing the wastage that naturally occurs in such stacks.

SUMMARY OF INVENTION

In a first aspect, the invention relates to a method of positioning a protective sheet to cover a stack of goods having first and second opposing sides and a top surface,
  (a) the protective sheet comprising first and second opposing parallel sides, each side comprising an attached first and second rigid elongate member extending substantially the entire length of each respective parallel side of the sheet, each rigid elongate member having attached at least one securing strap and at least one positioning strap, with
  (b) a lifting device comprising a support for mounting the first rigid elongate member in a substantially horizontal orientation, the support comprising at least one positioning strap projector;
the method involving the steps of:
  (1) engaging the lifting device to lift the first rigid elongate member adjacent to a first side of the stack of goods, while the first rigid elongate member remains substantially horizontal, wherein the at least one positioning strap attached to the first rigid elongate member being lifted is loaded into a respective at least one positioning strap projector, until the first rigid elongate member is positioned above the top surface of the stack of goods;
  (2) projecting the at least one positioning strap from the at least one positioning strap projector, such that the at least one positioning strap passes over the top of the stack and down the second side of the stack;
  (3) securing the at least one positioning strap and disengaging the first elongate rigid member from the support so that the sheet is free of the lifting device;
  (4) applying tension to the at least one positioning strap so as to pull the first elongate rigid member across the top surface of the stack of goods towards the second side of the stack of goods whilst also lifting the second elongate rigid member up the first side of the stack of goods;
  (5) once the sheet is in place over the top surface of the stack of goods, securing the at least one securing strap depending from both the first and second rigid elongate members to a respective location at or near the base of the first and second side of the stack of goods respectively.

In a second aspect, the invention relates to a stack of goods having first and second opposing sides and a top surface substantially covered by a protective sheet, the protective sheet comprising first and second opposing parallel sides, each side comprising an attached first and second rigid elongate member extending substantially the entire length of each respective parallel side of the sheet, each rigid elongate member having attached at least one securing strap, wherein the first and second rigid elongate members are located at or near the top of the first and second sides of the stack of goods, and the securing straps are secured to a location at or near the base of the first and second side of the stack of mods respectively.

The goods can be any perishable goods that are formed into a stack that could be expected to be exposed to the elements. Typically, the goods are bales of straw or hay but could be other perishable goods such as wood, The present invention is particularly suitable to large stacks of goods. Thus, preferably the stack of goods is greater than 5 m, more preferably greater than 8 m tall.

In a third aspect, the invention relates to a protective sheet for covering a stack of goods, the protective sheet comprising first and second opposing parallel sides, each side comprising an attached first and second rigid elongate member extending substantially the entire length of each respective parallel side of the sheet, each rigid elongate member having attached at least one securing strap.

The rigid elongate members may take a variety of forms, however a convenient form is a metal tube.

The present invention is particularly suitable for large sheets, and thus preferably the sheet covers an area greater than 100 m².

Each opposing side should have sufficient securing traps according to the prevailing needs, However it has been found that from two to eight securing straps is generally sufficient.

In a fourth aspect, the invention relates to a support for a lifting device for lifting a protective sheet as described herein, the support comprising:
  (a) a horizontal support bar comprising a mount for reversibly mounting an elongate rigid member in a substantially horizontal orientation; and
  (b) at least one positioning strap projector.

The support preferably comprises two positioning strap projectors, as this provides a means to evenly pull the sheet over the top surface of the stack. However, there could be more than two.

The positioning strap projectors are preferably operable by catapulting a coil of positioning strap.

Thus, the present invention provides a method for positioning a protective sheet to cover a stack of goods, which can be applied to even very high stacks, without the need for sending a human being up onto the stack.

Furthermore, the invention provides a means of securing the protective sheet to the stack at high levels of tension and thus mechanically strengthening such a stack to prevent it from being damaged or destroyed by high winds.

BRIEF DESCRIPTION OF THE DRAWINGS

The invention will now be illustrated by reference to the accompanying figures, in which.

DESCRIPTION

Figure 1:
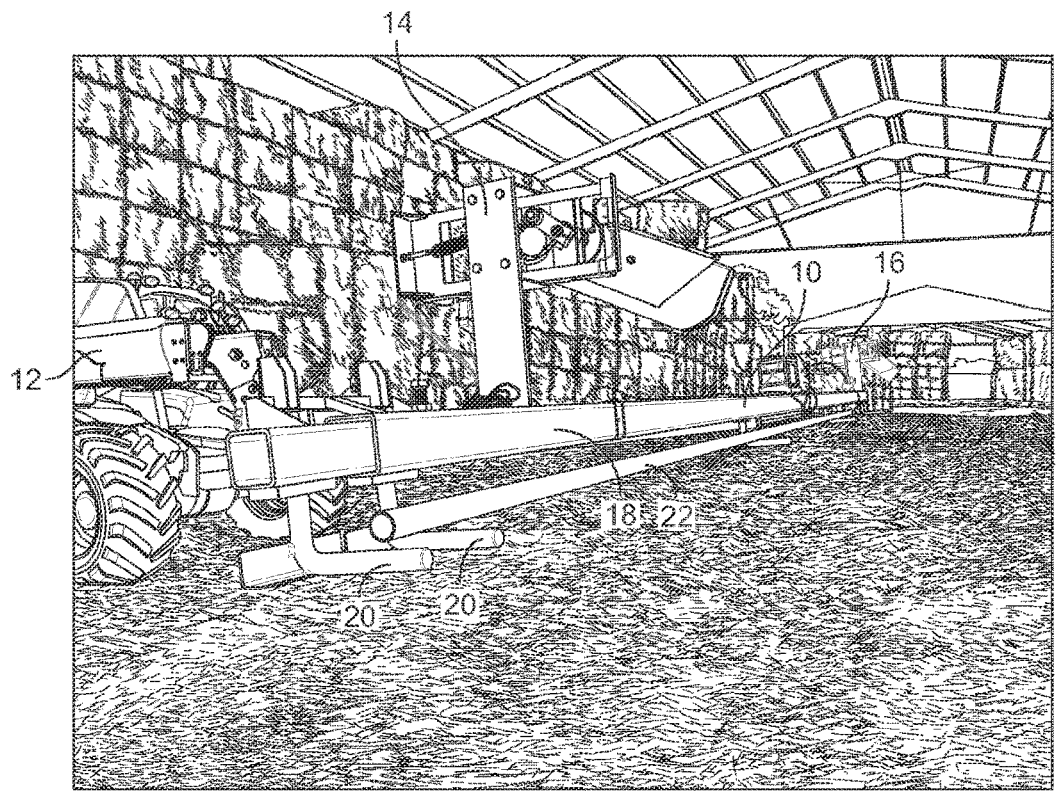
FIG. 1 is an image of a support for use with the present invention.

Turning to the figures, FIG. 1 shows a support 10 attached to a lifting device 12, which in this case is a commercially available 17 m telehandler. The support comprises a horizontal beam 18, which comprises a box section with another such box section beam inserted therein to provide a telescopic function, and a number of depending bent metal rods 20, so that they can support an elongate metal pole 22, which can act as a rigid elongate member according to the invention. The support also comprises two positioning strap projectors 14, 16 fixed 3.6 m from the centre of horizontal beam 18 operated by a 12 volt battery located in the centre of the support 10. The strap projectors are arranged to be activated remotely, e.g. from the ground.

The telehandler 12 comprises a boom extension, which is a 10 mm thick right angle plate locked in by securing clips.

Figure 2:
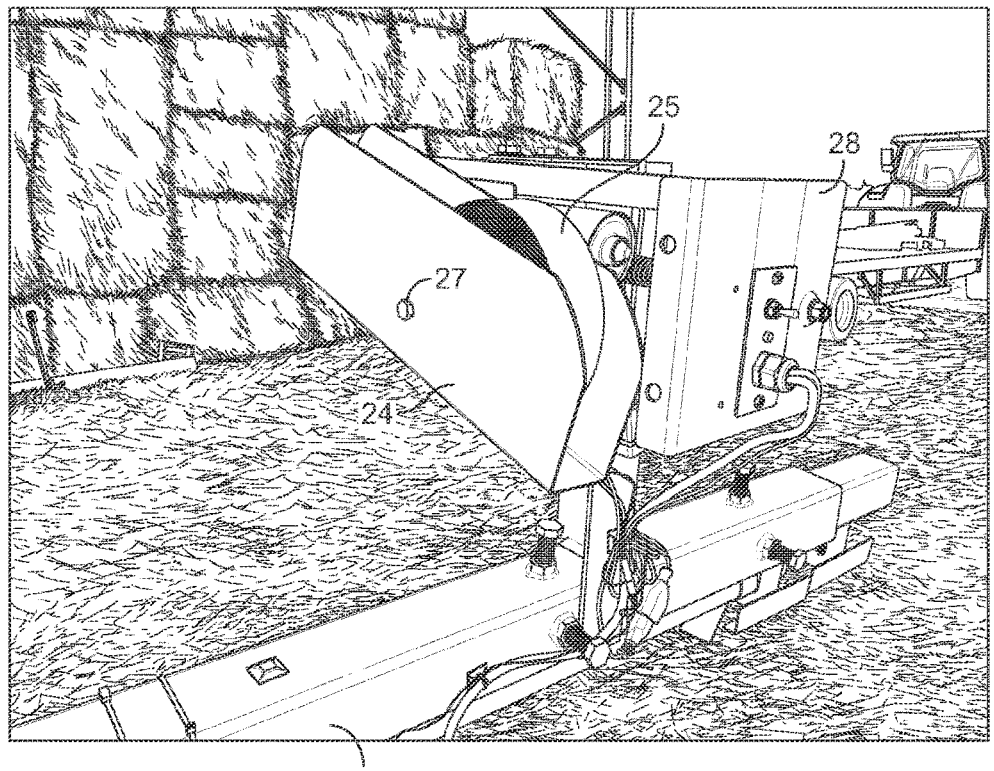
FIG. 2 is an image of a securing strap projector mounted on a support.

FIG. 2 shows a close up image of one of the strap projectors 14. As can be seen there is provided a holder 24 for containing a coil of positioning strap 25. The positioning strap is 50 mm wide nylon. One end of positioning strap 25 is attached to pole 22. Holder 24 is adapted to be rotatable about a horizontal axis, located by nut 27. Also provided is a control box 28 which actuates the holder 24 when a command is sent remotely, e.g. from the cabin of telehandler 12.

In use, the control box 28 actuates the holder 24 to rotate rapidly in a counter-clockwise direction from the perspective of FIG. 2. This has the effect of the coil of positioning strap 25 leaving the holder 24 and being projected and unravelled at the same time. Thus the coil of positioning strap 25 is catapulted or thrown.

Figure 3:
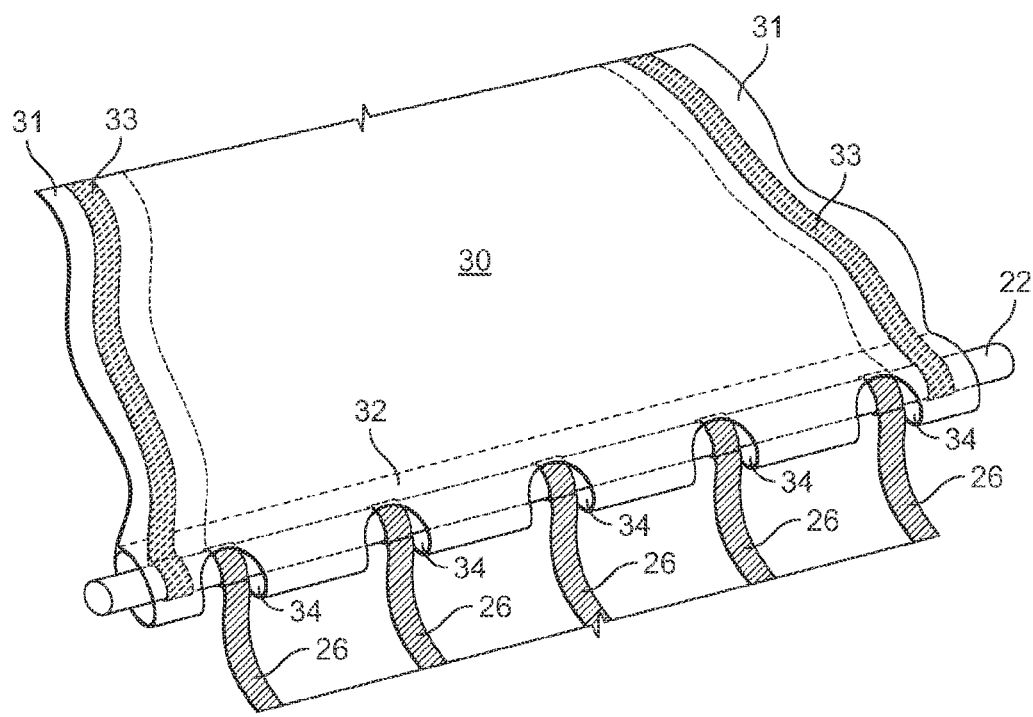
FIG. 3 is a perspective view of a portion of a protective sheet according to the present invention.

FIG. 3 shows a protective sheet 30 according to the present invention. At one end the sheet material is folded and stitched onto itself to create a sheath 32 so that pole 22 can be inserted therein. Also provided are five cutouts 34 to provide access to the five securing straps 26 attached on the pole 22. The cutouts also are located where the bent metal rods 20 of the support engage with the pole 22.

As the positioning straps 25 need to extend along one side of the stack 40 and a portion of the top surface, they are generally longer than the securing straps 26 that only need to extend down one side of the stack.

In a further refinement, the sides of the sheet 30 are also folded in to create sheaths 31 down the sides. Into these sheaths 31 are inserted side straps 33 which extend along the sides and are looped around the pole 22. Importantly, the side straps 33 are a distance, e.g. 20 mm, from the end of sheath 32. This has the effect that when pole 22 is pulled by securing straps 26 the side straps 33 are pulled in tight before the rest of sheet 30. This allows the sides of the sheet to bite into the stack and provide a tight fit on the sides of the sheet 30.

Figure 4:
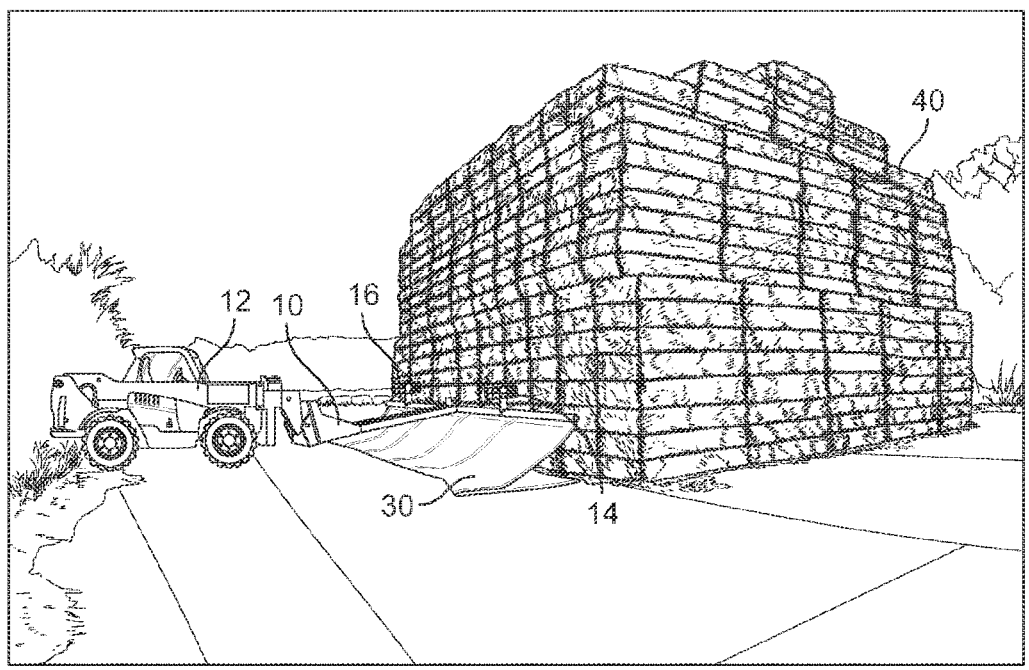
FIG. 4 is an image of a stack of goods about to be covered by a protective sheet.

FIG. 4 shows a stack of straw bales together forming a stack of goods 40 according to the present invention.

Also shown is the lifter 12 having mounted thereon the support 10 as discussed in relation to FIG. 1. In this arrangement sheet 30 is provided, which is rectangular in shape and generally in accordance with the sheet described in relation to FIG. 3.

As such the two positioning straps 25 are wound into a coil and placed into securing strap projectors 14, 16. Their outer end is secured to the pole 22 at one of the cutouts 34.

Figure 5:
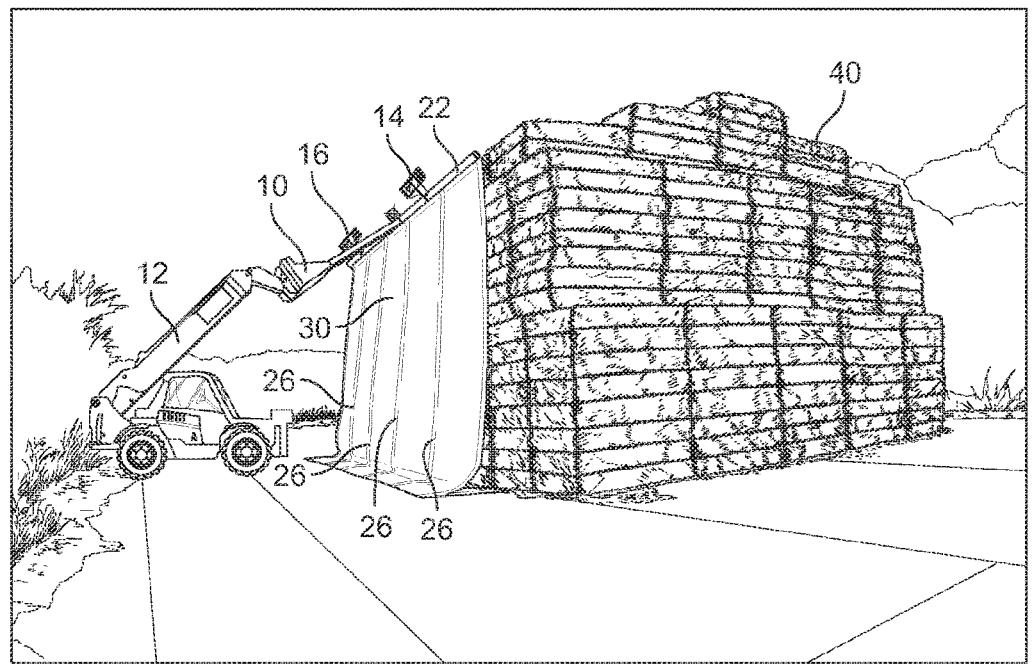
FIG. 5 is an image of the stack of goods shown in FIG. 3, as a protective sheet is lifted along one side of the stack of goods.

The lifter 12 then lifts the support 10 which lifts the rigid elongate pole 22 which in turn lifts the sheet 30 upwards adjacent to the first side of the stack of goods 40, as can be seen in FIG. 5.

Figure 6:
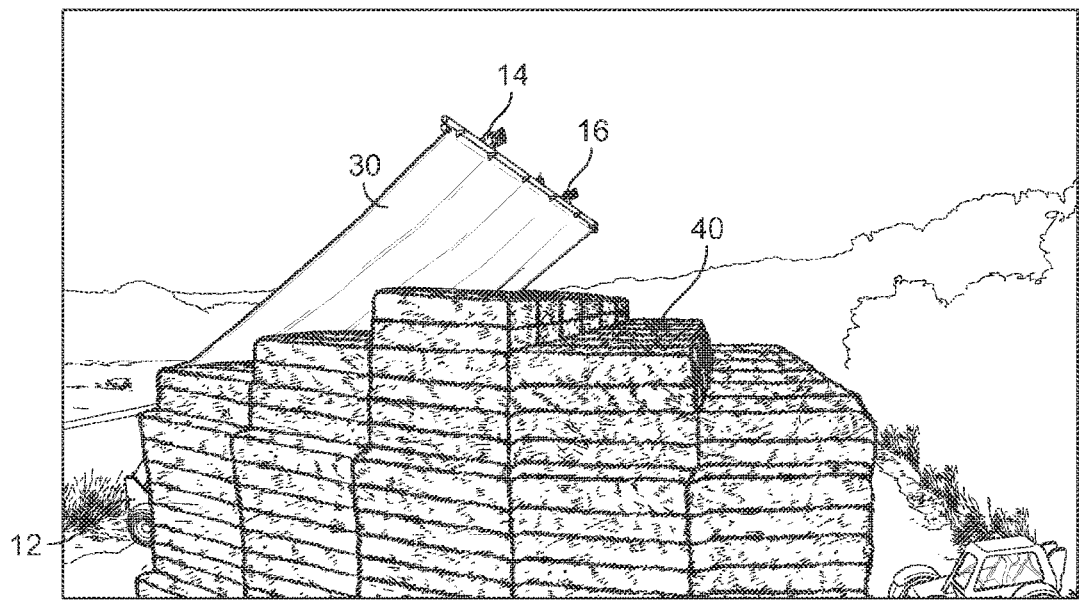
FIG. 6 is an image of the stack of goods shown in FIG. 3, wherein the protective sheet is above the top surface of the stack of goods.

The lifter then continues to raise the support 10 and pole 22 so that the pole is located approximately centrally above the top surface of the stack of goods as shown in FIG. 6.

Figure 7:
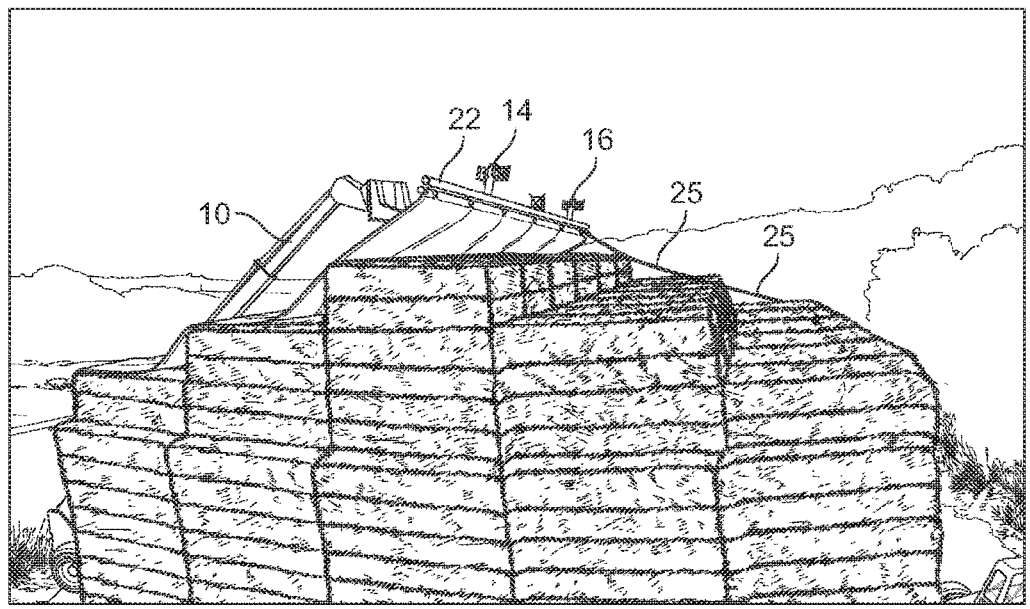
FIG. 7 is an image of the stack of goods shown in FIG. 3, wherein the securing straps are being projected by strap projectors.

Once in position, the strap projectors 14, 16 project the coils of positioning strap over the top surface of the stack 40 and down the opposite side of the stacks as can be seen in FIG. 7.

Figure 8:
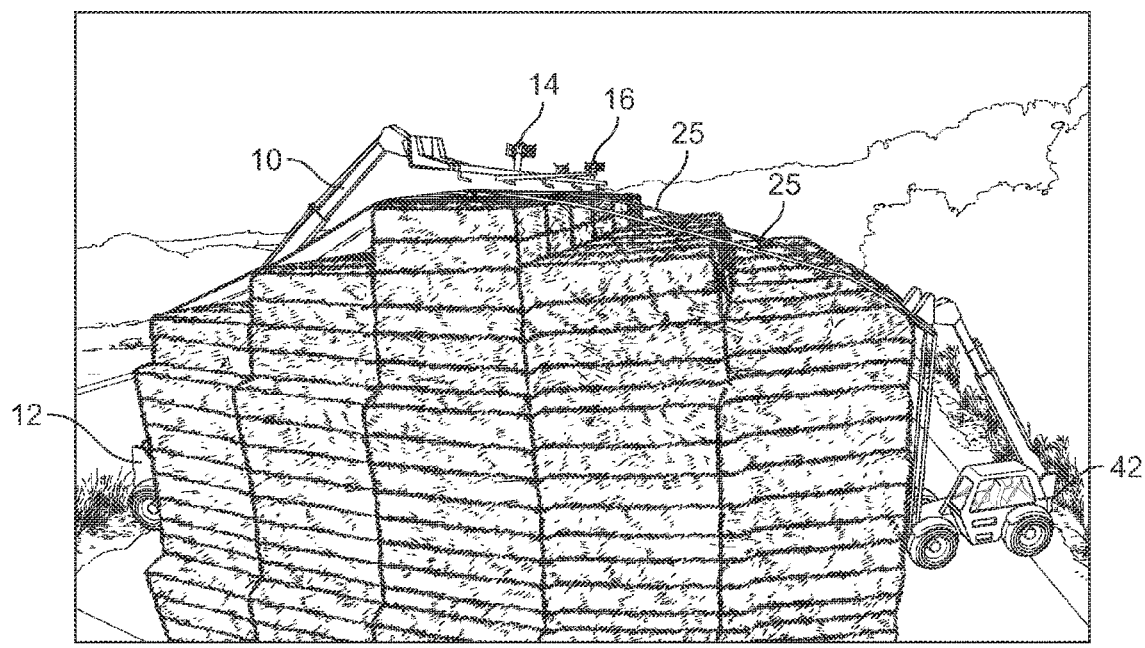
FIG. 8 is an image of the stack of goods shown in FIG. 3, wherein the protective sheet is free from the lifting device and the securing straps are secured.

The ends of the positioning straps are then secured, in this case to a second telehandler 42. Second telehandler 42 then tensions the positioning straps 25 so that pole 22 is pulled out of the retaining feature of the bent metal rods 20. This has the effect of the pole 22 falling onto the top surface of the stack of goods, as can be seen in FIG. 8. Alternatively the positioning straps could be pulled by a winch.

Figure 9:
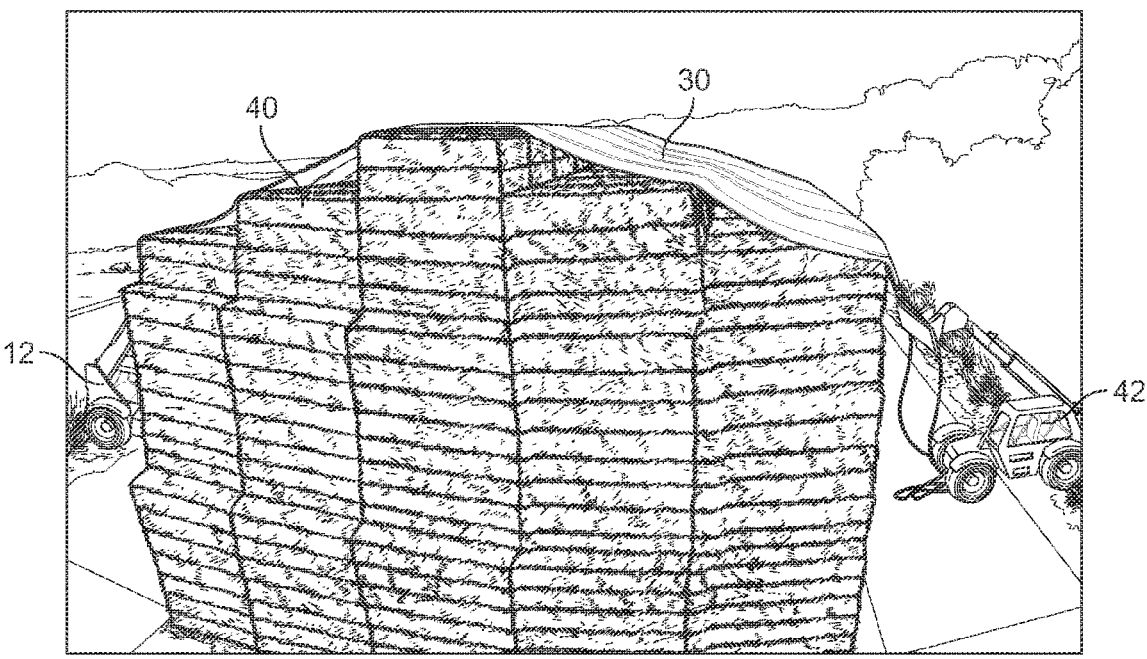
FIG. 9 is an image of the stack of goods shown in FIG. 3, wherein the sheet has been pulled to cover the top surface of the stack of goods with the protective sheet in its final covering position.

The telehandler 42 continues to tension the positioning straps 25 until the protective sheet is in place over the top of the stack 40, as seen in FIG. 9.

Figure 10:
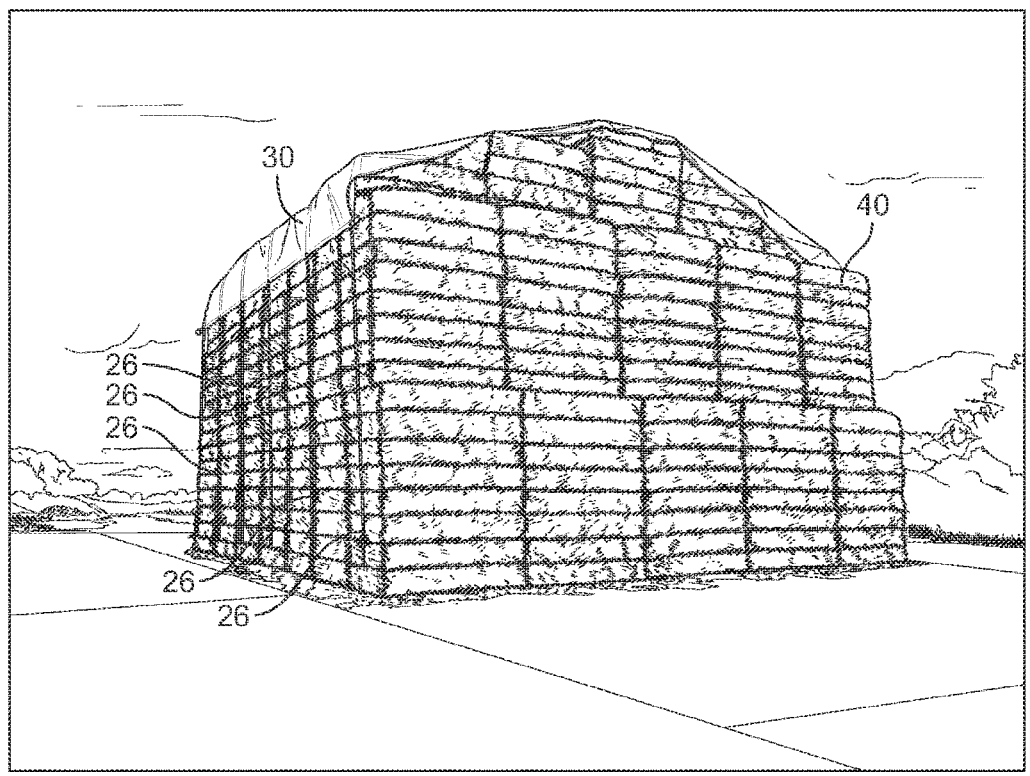
FIG. 10 is an image of the stack of goods shown in FIG. 3, wherein the sheet is secured in place by tensioning the securing straps.

To finalise the positioning of the sheet, metal rods (not shown) are inserted into the body of bales at the base of the stack. The positioning straps 25 are removed from the pole 22 and the ends of the securing straps 26 are attached to the metal rods. A ratchet device can be added to the ends of the securing straps 26 at this point so that more tension can be applied to the securing straps 26. The end result is a protected stack as shown in FIG. 10.

As the securing straps are attached to the rods 22 and not directly to the sheet material, there is no danger of tearing of the sheet, even if high levels of tension are applied to the securing straps. This has the effect that a very tight and compact structure can be produced which provides stability to the stack as shown in FIG. 10.

In an alternative embodiment, instead of having five securing straps and two positioning straps, it would be possible to have five securing straps, a number of which also act as positioning straps. Clearly the positioning straps need to be longer than the securing straps, so this arrangement would result in the straps that act as both securing and positioning straps being a little longer than necessary in the final finished covered stack.

The invention claimed is:

1. A method of positioning a protective sheet to cover a stack of goods having first and second opposing sides, a top surface, and a height greater than 5 meters,
    (a) the protective sheet comprising first and second opposing parallel sides, each opposing parallel side of the protective sheet comprising an attached first and second rigid elongate member extending substantially an entire length of each respective parallel side of the protective sheet, each rigid elongate member having attached at least one securing strap and at least one positioning strap, with
    (b) a lifting device comprising a support for mounting the first rigid elongate member in a substantially horizontal orientation, the support comprising at least one positioning strap projector;
the method involving the steps of:
    (1) engaging the lifting device to lift the first rigid elongate member adjacent to the first opposing side of the stack of goods, while the first rigid elongate member remains substantially horizontal, wherein the at least one positioning strap attached to the first rigid elongate member being lifted is loaded into a respective at least one positioning strap projector, until the first rigid elongate member is positioned above the top surface of the stack of goods;
    (2) projecting the at least one positioning strap from the at least one positioning strap projector, such that the at least one positioning strap passes over the top surface of the stack of goods and down the second opposing side of the stack of goods;
    (3) securing the at least one positioning strap and disengaging the first elongate rigid member from the support so that the sheet is free of the lifting device;
    (4) applying tension to the at least one positioning strap so as to pull the first elongate rigid member across the top surface of the stack of goods towards the second opposing side of the stack of goods whilst also lifting the second elongate rigid member up the first opposing side of the stack of goods; and
    (5) once the sheet is in place over the top surface of the stack of goods, securing the at least one securing strap depending from both the first and second rigid elongate members to a respective location at or near a base of the first and second opposing sides of the stack of goods respectively.

2. The method according to claim 1, wherein the goods are bales of straw.

3. The method according to claim 1, wherein the rigid elongate members are metal tubes.

4. The method according to claim 1, wherein the sheet covers an area greater than 100 m$^2$.

5. The method according to claim 1, wherein each opposing parallel side comprises from two to eight securing straps.

6. The method according to claim 1, wherein the at least one positioning strap projector comprises two positioning strap projectors.

* * * * *